United States Patent

Tashiro et al.

[11] Patent Number: 5,497,741
[45] Date of Patent: Mar. 12, 1996

[54] TORQUE CONTROL SYSTEM FOR INTERNAL COMBUSTION ENGINES

[75] Inventors: Hiroshi Tashiro, Nagoya; Takaji Murakawa, Kariya; Toyoji Yagi, Anjo, all of Japan

[73] Assignee: Nippondenso Co., Ltd., Kariya, Japan

[21] Appl. No.: 276,456

[22] Filed: Jul. 18, 1994

[30] Foreign Application Priority Data

Jul. 19, 1993 [JP] Japan .................................. 5-177927

[51] Int. Cl.$^6$ ................................................ F02B 75/06
[52] U.S. Cl. ................................................ 123/192.1
[58] Field of Search ............................ 123/192.1, 192 R, 123/339

[56] References Cited

U.S. PATENT DOCUMENTS

| | | | |
|---|---|---|---|
| 4,513,710 | 4/1985 | Kobayashi et al. | 123/339 |
| 4,836,164 | 6/1989 | Morozumi et al. | 123/339 |
| 5,033,425 | 7/1991 | Kadomukai et al. | 123/192 R |
| 5,105,776 | 4/1992 | Tsuchiya et al. | 123/192.1 |
| 5,125,236 | 6/1992 | Clancey | 62/115 |
| 5,163,399 | 11/1992 | Bolander et al. | 123/339 |
| 5,415,139 | 5/1995 | Aoto et al. | 123/192.1 |

FOREIGN PATENT DOCUMENTS

| | | |
|---|---|---|
| 2563280 | 4/1984 | France . |
| 59-185872 | 10/1984 | Japan . |
| 1130030 | 5/1989 | Japan . |
| 02016339 | 3/1990 | Japan . |
| WO91/16532 | 10/1991 | WIPO . |

Primary Examiner—Raymond A. Nelli
Attorney, Agent, or Firm—Cushman, Darby & Cushman

[57] ABSTRACT

A torque control system for engines reduces electric power consumption by appropriately avoiding torque application after the engine starts increasing its torque output. The system detects the ignition timing of an engine and initiates motor mode operation of a motor-generator. The motor-generator continuously applies torque to number of ignitions which occur immediately before the engine torque actually starts increasing under the torque increase command, and then initiates generator operation of the motor-generator. Since the motor operation of the motor-generator terminates almost simultaneously with the increase in engine torque, there is no overlap between torque application by the motor-generator and increase torque output of the engine, and effective torque application and savings of battery power can be achieved.

31 Claims, 5 Drawing Sheets

TORQUE CONTROL SYSTEM FOR INTERNAL COMBUSTION ENGINES

BACKGROUND OF THE INVENTION

1. Field of the Invention

The present invention generally relates to a torque control system for internal combustion engines, and more particularly to a torque control system for internal combustion engines which enables engine torque control with a high responsiveness to, for instance, vehicle acceleration.

2. Description of Related Art

Japanese unexamined patent application laid-open No. 1-130030 discloses a torque control system which enables an internal combustion engine mounted on a vehicle to have a high responsiveness to acceleration at an early stage thereof. Specifically, torque is applied to such an extent that the rpm (rotational speed) of the internal combustion engine is increased by the preset rpm from the instantaneous rpm of the internal combustion engine at the time when the acceleration command is detected.

In addition, Japanese unexamined patent application laid-open No. 59-185872 discloses a torque control system in which, when the rpm of an internal combustion engine falls below the instantaneous rpm of the internal combustion engine in an idling operation, generator operation of a generator-motor connected to an internal combustion engine stops and the motor operation starts to prevent any rpm drop.

However, in each of the above conventional torque application methods, as the torque application is stopped only after actual rpm rise is detected, there is a drawback that electric power consumption is wasted and energy is lost by continuously applying torque to the internal combustion engine even after the torque of the internal combustion engine has begun to increase.

SUMMARY OF THE INVENTION

In view of the above drawback, it is an object of the present invention to provide a torque control system for internal combustion engines which can save electric power consumption by most appropriately stopping torque application by motor operation of a generator-motor after the torque of the internal combustion engine has begun to increase.

A torque control system for internal combustion engines according to the present invention is characterized by torque applying means torque applicably connected to an internal combustion engine, ignition number detecting means for detecting number of ignitions of the internal combustion engine, torque application start commanding means for commanding motor operation start to the torque applying means under the torque increase command from the internal combustion engine, and torque application stop commanding means for commanding motor operation stop to the torque applying means based on the detected number of ignitions immediately before torque increases under the torque increase command. In the preferred embodiments, the above torque application stop commanding means commands operation stop to the torque application start commanding means with a timing near the third ignition timings after the torque increase command.

The torque application start commanding means commands motor operation start to the torque applying means under the torque increase command from the internal combustion engine, while the torque application stop commanding means commands motor operation stop to the torque applying means according to the number of ignitions immediately before the torque of the internal combustion engine begins to increase under the torque increase command. The torque applying means continuously applies torque to the internal combustion engine from the time when the motor operation start command is inputted to the time when the motor operation stop command is inputted.

The present invention is based on the following fact. When torque increase is commanded to the internal combustion engine (spark-ignited four-stroke type), the volume of air-fuel mixture supplied into engine cylinder in the next engine stroke increases. In the following stroke, the air-fuel mixture the volume of which has increased in the cylinder is compressed. Then, in the following stroke, the air-fuel mixture is ignited and exploded, whereby torque increases. Namely, when at least two engine strokes consisting of the intake stroke following the torque increase command and the compression stroke have been substantially performed, torque increase is achieved. In a four-cylinder engine, torque increase is achieved after the third ignition counted from the torque increase command.

As described in the above, an object of the present invention is to determine the delay time from the torque increase command to the torque increase achievement based on the number of ignitions and thereby control the torque application period based on the preset number of ignitions with the achievement of torque increase. As a result, both effective torque application and electric power saving can be achieved.

DETAILED DESCRIPTION OF THE PREFERRED EMBODIMENTS

Figure 1:
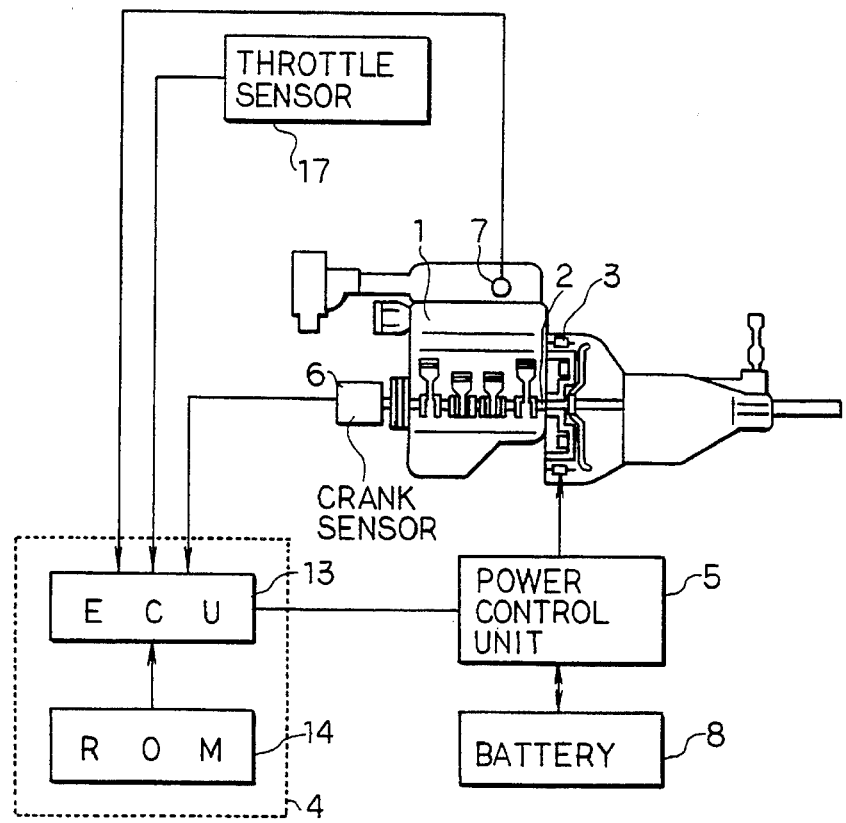
FIG. 1 is a block diagram illustrating a torque control system for internal combustion engines according to the present invention.

FIG. 1 illustrates in block diagram form a whole structural configuration of a torque control system for internal combustion engines according to the present invention.

The torque control system comprises a generator-motor (a part of torque applying means) 3 torque transferably connected to a crank shaft 2 of a spark-ignited four-stroke type internal combustion engine 1 functioning both as an electric power generator and as an electric motor, timing determining means (torque application start commanding means and torque application stop commanding means) 4 composed of a microcomputer (electronic control unit 13, read only memory 14 etc.) for determining torque application timing (i.e., generator/motor operation switching timing) of the generator-motor 3, an electric power control unit (a part of torque applying means) 5 for switching operation mode from/to the generator operation to/from motor operation of the generator-motor 3 based on the timing determined by the timing determining means 4, a crank angle sensor 6 for detecting the crank angle, an ignition number detecting means 7 built in an igniter (not illustrated) for detecting number of ignitions, a battery (a part of the torque applying means) 8 for transmitting and receiving electric power to and from the generator-motor 3, and a throttle opening sensor 17 for detecting the opening of a throttle valve of the engine 1 (not illustrated) and outputting the same to the timing determining means 4.

The generator-motor 3 is composed of a well-known rotary electric machine which is furnished with both an exciting coil and an armature coil and is capable of switching its operation mode from/to the generator mode for generating electric power to be stored in the battery 8 to/from the motor mode for producing rotation power with the electric power supplied from the battery 8, by changing the voltage applied to the exciting coil and the armature coil.

The basic operation of the generator-motor 3 will now be described. The generator-motor 3 alternatingly repeats the generator operation and the motor operation to receive and transmit torque from and to the internal combustion engine 1, respectively, and also transmit and receive electric power to and from the battery 8, respectively.

The crank angle detecting means 6 detects the crank angle or rotational position angle of the crank shaft 2 of the internal combustion engine 1 and detects the rpm or rotational speed thereof based on the detected crank angle. It is known that the phase difference between the primary frequency component of vehicle body vibrations (described later) and the crank angle interrelatedly varies according to variations in the rpm of the internal combustion engine 1.

Accordingly, the timing determining means 4 determines such a torque applying timing or motor operation timing that can reduce the primary frequency component of vehicle body vibrations based on the rpm of the internal combustion engine 1. The electric power control unit 5 switches the generator/motor operation timing of the generator-motor 3 based on the timing determined by the timing determining means 4.

Figure 2:
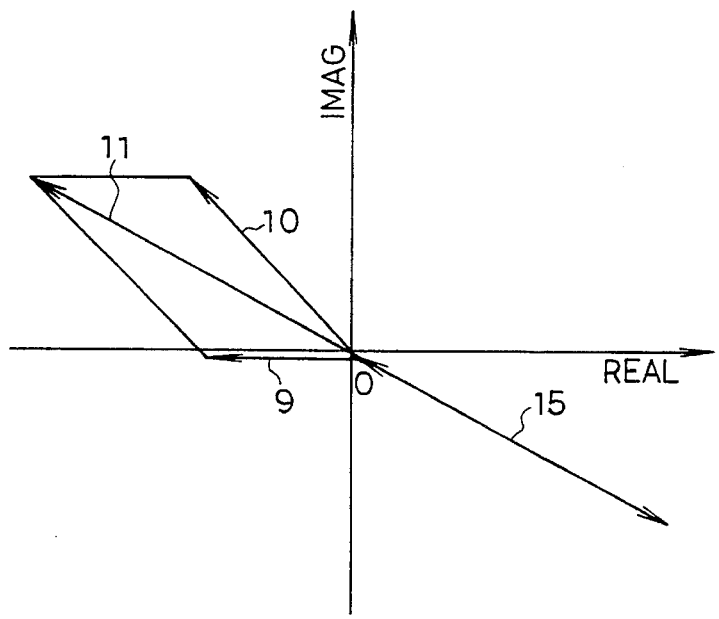
FIG. 2 is a vector diagram illustrating a phase relationship among a primary frequency component of vehicle body vibrations (composite vector), a vertical vehicle body vibration component and a rotational vehicle body vibration component.

More detailed description will now be given to the above vehicle body vibrations referring to a vector diagram illustrated in FIG. 2.

In a vehicle equipped with the internal combustion engine 1 (e.g., an in-line four-cylinder four-stroke engine), the primary frequency component of vehicle body vibrations is the primary frequency component of air-fuel mixture explosions of the internal combustion engine 1 (the secondary component of the rpm of the internal combustion engine 1). The main component of this primary frequency component of air-fuel mixture explosions is composed of a vertical vibration component of the internal combustion engine 1 and a rotational vibration component in the periphery of the crank shaft 2. These vertical and rotational vibration components are the same in frequency, the respective frequencies thereof being proportional to the frequency of the crank angle signal, but different in phase. As illustrated in FIG. 2, the primary frequency component of vehicle body vibrations is represented by a composite vector 11 composed of a vertical vehicle body vibration component 9 caused by the above vertical vibration component of the internal combustion engine 1 and a rotational vehicle body vibration component 10 caused by the above rotational vibration component of the internal combustion engine 1 (more precisely, a rotational drive system including the internal combustion engine).

The rotational vibration component in the periphery of the crank shaft 2 of the rotational drive system has the preset phase against the crank angle signal, based on which the rpm of the internal combustion engine 1 is detected, and this phase varies according to the rpm of the internal combustion engine 1. Accordingly, the rotational vehicle body vibration component 10 also has the preset phase against the crank angle signal, and this phase also varies according to the rpm of the internal combustion engine 1.

Similarly, the vertical vibration component of the internal combustion engine 1 has the preset phase against the crank angle signal, based on which the rpm of the internal combustion engine 1 is detected, and this phase varies according to rpm of the internal combustion engine 1. Accordingly, the vertical vehicle body vibration component 9 also has the preset phase against the crank angle signal, and this phase also varies according to the rpm of the internal combustion engine 1.

In short, the primary vehicle body vibration frequency component (composite vector) 11 has the preset phase against the crank angle signal, based on which the rpm of the internal combustion engine 1 is detected, and this phase varies according to the rpm of the internal combustion engine 1.

The above vertical vibration component of the internal combustion engine 1 is caused by vertical motions of an engine piston. Since the piston is connected to the generator-motor 3 through the crank shaft 2, the generator-motor 3 transmits and receives mechanical energy or torque to and from the piston of the internal combustion engine 1. It is understood, therefore, that the torque generated in one cycle of the piston composed of one explosion interval can be made flat by controlling the generator/motor operation switching timing of the generator-motor 3.

In this embodiment, the generator/motor operation switching timing of the generator-motor 3 is in a phase opposite to the composite vector 11 to reduce the primary vehicle body vibration frequency component (composite vector) 11. As a result, a vibration vector 15, which is opposite in phase to the composite vector 11 is generated, whereby both the rotational vehicle body vibration component 10 and the vertical vehicle body vibration component 9 are reduced. For brevity, the delay in torque transfer from the generator-motor 3 to the vehicle body is not considered in this description.

In short, both the rotational vehicle body vibration component 10 and the vertical vehicle body vibration component 9 can be reduced by generating the vibration reduction vector 15 which is opposite in phase to the composite vector 11 and the same in frequency (FIG. 2) by means of the generator/motor operation switching timing of the generator-motor 3.

Next, the operation of the torque control system according to the first embodiment will be described referring to a flow chart illustrated in FIG. 3. The following processes are mostly performed by the ECU 13.

The operation routine starts when an ignition switch (not shown) is turned on to supply electric power from the battery 8, and a torque assist sub-routine 100 (described later in detail) is performed.

Following the torque assist sub-routine 100, in Step 102, the crank angle signal is read from the crank angle sensor 6 and the throttle opening is read from the throttle opening sensor 17. Then, in Step 104, the rpm of the internal combustion engine 1 is calculated based on the read crank angle.

Next, in Step 106, a judgement is formed whether or not the internal combustion engine 1 is in the idling state based on the rpm of the internal combustion engine 1 and the throttle opening. If the judgement is negative (NO), the process returns to Step 100, and if the judgement is positive (YES), the process proceeds to Step 108 and phase difference corresponding to the rpm of the internal combustion engine 1 is obtained from the ROM 14. The phase difference referred to herein is, as described in the above, the difference in phase between the primary vehicle body vibration frequency component (composite vector) 11 and the crank angle on condition that the ROM 14 stores therein the above relation between the rpm of the internal combustion engine 1 and the phase difference.

In Step 110, the generator/motor operation switching timing of the generator-motor 3 is obtained from the obtained phase difference. Here, the physical significance of this step will be described. In this embodiment, the relation between the phase difference (phase angle) and the rpm of the internal combustion engine 1 against the crank angle of the primary frequency component of vehicle body vibrations are stored in the ROM 14 through experiments or simulations. However, as it takes a certain time for the positive/negative torque of the generator-motor 3 to be transferred through the internal combustion engine 1 to the vehicle body in Step 110, the phase difference corresponding to this time lag (hereinafter referred to as "transfer phase difference" which also varies according to the rpm of the internal combustion engine 1) is subtracted from the phase difference calculated in Step 108 so as to determine the generator/motor operation switching timing of the generator-motor 3.

Accordingly, when the generator-motor 3 performs generator/motor operation switching, compensatory vibrations can be applied to the vehicle body in a phase opposite to the primary vehicle body vibration frequency component (composite vector) 11, whereby a high vehicle body vibration damping effect can be obtained.

Incidentally, if the relation between the phase difference and the rpm of the internal combustion engine 1 (including the delay in torque transfer between the generator-motor 3 and the internal combustion engine 1 and the delay in torque transfer between the internal combustion engine 1 and the vehicle body) is directly stored in the ROM 14, Steps 108 and 110 can be combined into a single step.

In the following step, Step 112, damping control is performed with the above generator/motor operation switching timing. The voltage to be applied to the exciting coil and the voltage to be applied to the armature coil (both the exciting coils and the armature coil being mounted on the generator-motor 3) are stored for one cycle in the table form in the ROM 14 for each preset crank angle. Then, each time the above preset crank angle is passed with the above generator/motor operation switching timing, the corresponding voltages are read, and a pulse voltage with duty ratios corresponding to the read voltages are respectively outputted to the electric power control unit 5. When the electric power control unit 5 receives the above voltages, the electric power control unit 5 switches the voltage to be applied from the battery 8 to the exciting coil and the voltage to be applied from the battery 8 to the armature coil of the generator-motor 3 according to the above duty ratios and the above voltages read for each instantaneous value of the crank angle are applied to the exciting coil and armature coil of the generator-motor 3 respectively.

Now, the generator-motor 3 can read from the ROM 14 single-cycle waveforms of the voltage to be applied to the exciting coil and voltage to be applied to the armature coil at the timing corresponding to the above phase difference and then apply the voltage to be applied to the exciting coil and voltage to be applied to the armature coil corresponding to the respective read single-cycle waveforms to the exciting coil and to the armature coil respectively. As a result, the opposite phase torque of the primary frequency component of vehicle body vibrations 11 can be generated to counteract the vehicle vibration.

In short, the rotational vehicle body vibration component 10 delays by the preset phase difference from the vertical vehicle body vibration component 9 due to the effect of the transfer system thereon or other cause, and this phase difference depends on the rpm of the internal combustion engine 1. Therefore, the vehicle vibration damping effect can be improved by compensating the reverse torque with the generator/motor operation timing different by 180 degrees from the composite vector 11 which is in advance of the rotational vehicle body vibration component 10 by the preset phase difference, as compared with the case where the reversed torque is compensated with the generator/motor operation timing different by 180 degrees from the rotational vehicle body vibration component 10.

The torque assist sub-routine 100 in FIG. 3 will now be described referring to a flow chart in FIG. 4.

In Step 202, the throttle opening Mo is read from the throttle sensor 17. In Step 203, the process idles for a preset time (e.g., 5 msec.). Then, in Step 205, the new throttle opening Mi is read again.

In Step 206, a judgement is formed whether or not the variation in the throttle opening, $\Delta M=Mi-Mo$, exceeds the preset threshold value Mth. If the judgement is negative, the process jumps to Step 102. If the judgement is positive, meaning a further opening of the throttle valve in the acceleration direction, the process proceeds to Step 207, the motor operation is commanded to the electric power control unit 5, and the electric power control unit 5 causes the generator-motor 3 to function as the motor to apply torque to the internal combustion engine 1 from the generator-motor 3.

In Step 208, immediately after the command for motor operation to the electric power control unit 5, the ignition signal inputted from an igniter (not illustrated) is counted. When the counter value reaches 3 in Step 209, a command is issued to the electric power control unit 5 to stop the motor operation in Step 210, and then the electric power control unit 5 causes the generator-motor 3 to stop the motor operation and return to the generator operation, whereby the torque application from the generator-motor 3 to the internal combustion engine 1 is stopped. Then, the process proceeds to Step 102.

Figure 3:
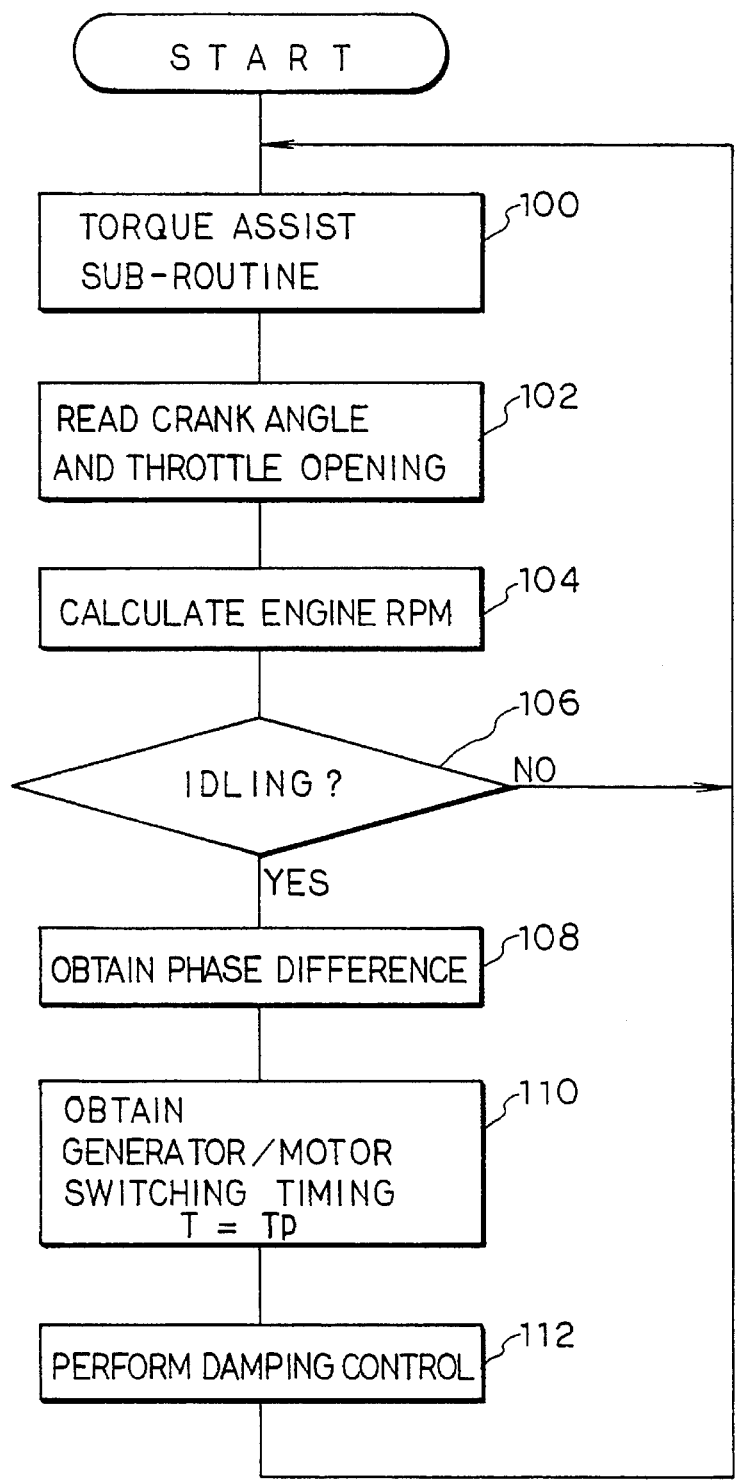
FIG. 3 is a flow chart illustrating a first embodiment of the torque control system for internal combustion engines illustrated in FIG. 1.
Figure 4:
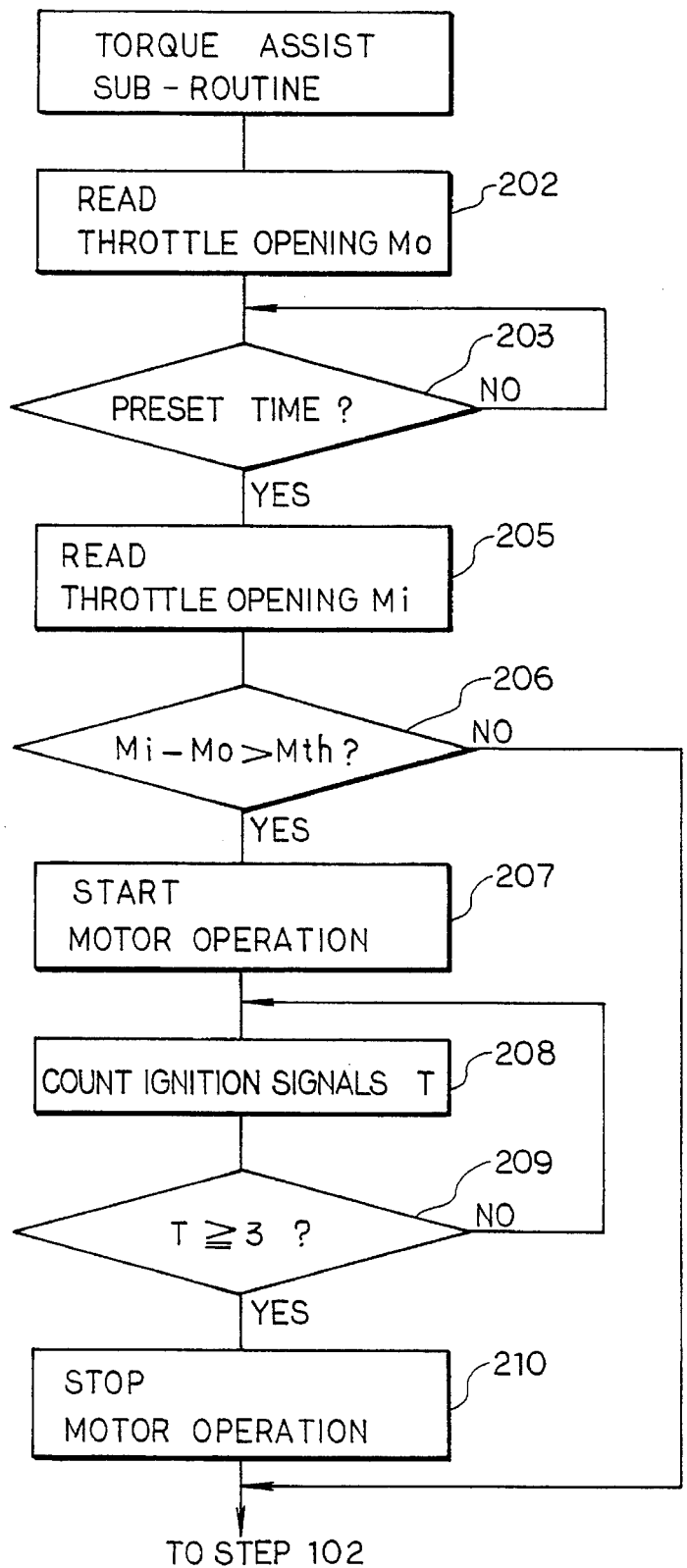
FIG. 4 is a flow chart illustrating a subroutine of a torque application operation illustrated in FIG. 3.

In this embodiment, though the damping control illustrated in FIG. 3 and the torque application control illustrated in FIG. 4 are performed together, it also is possible that the torque application control alone is performed. In this case, electric power consumption can be saved as the torque application is being stopped when the third ignition due to an increase in the torque of the internal combustion engine 1 is detected after the torque increase command is inputted in Step 206.

For reference, Step 207 constitutes torque application start commanding means, and Step 210 constitutes torque application stop commanding means.

Figure 5:
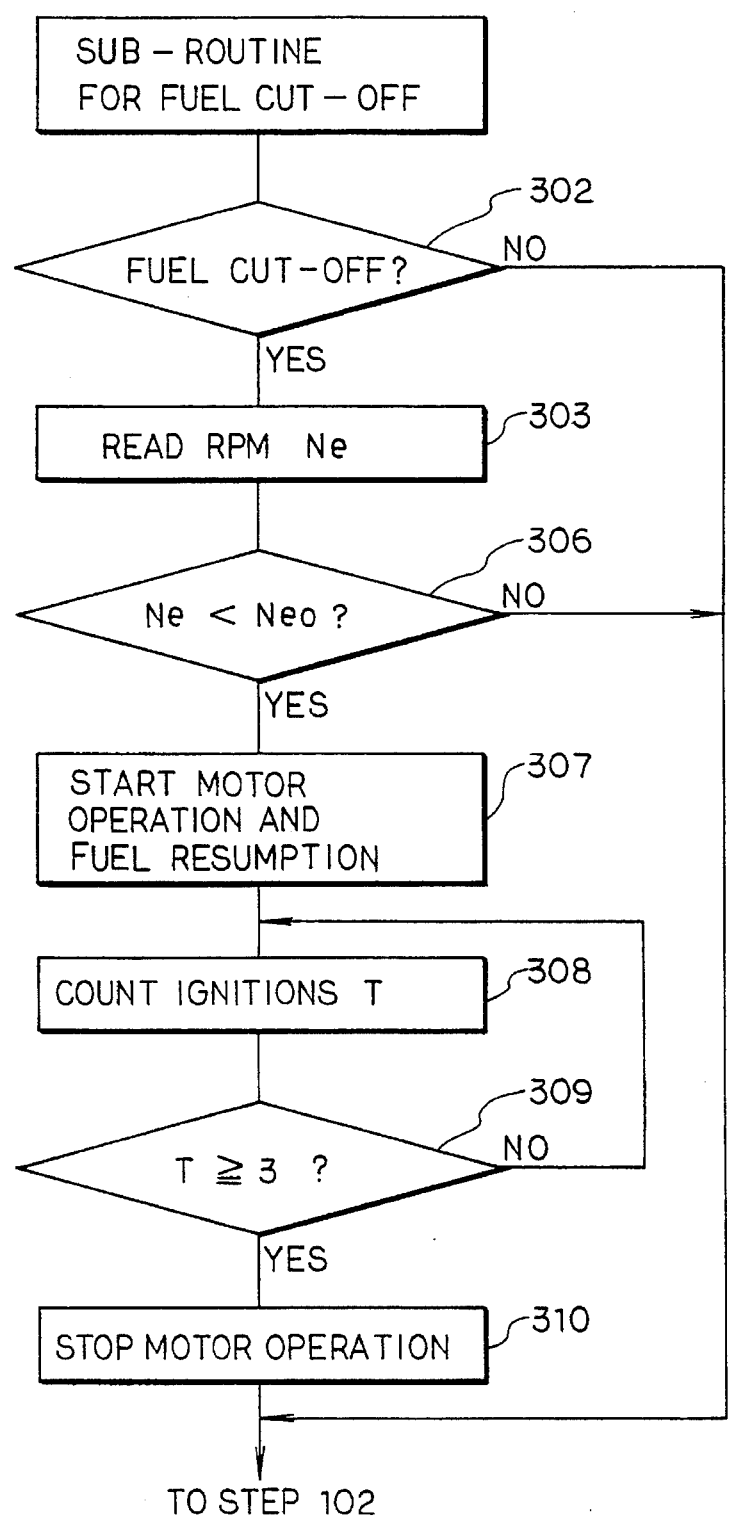
FIG. 5 is a flow chart illustrating a second embodiment of the torque application operation of the torque control system for internal combustion engines illustrated in FIG. 1.

Another embodiment will now be described referring to a flow chart illustrated in FIG. 5. This second embodiment is designed to prevent an excessive reduction in the rpm of the internal combustion engine 1 at the end of the fuel cut-off period in deceleration and to substitute the flow chart illustrated in FIG. 4.

In Step 302, a judgement is formed based on the signal from an engine control unit (not illustrated) whether or not the fuel cut-off is of such type that is performed when the vehicle is in deceleration and the rpm of the internal combustion engine 1 is equal to or more than the preset rpm. If the judgement is negative, the process jumps to Step 102, and if the judgement is positive, the rpm of the internal combustion engine 1, Ne, is read in Step 303.

Next, in Step 306, a judgement is formed whether or not the rpm Ne is smaller than the preset rpm Neo at which fuel injection is to be resumed (650 rpm in this case). If the judgement is negative, the process jumps to Step 102. If the judgement is positive, the motor operation start command is issued to the electric power control unit 5 in Step 307, and the electric power control unit 5 switches the generator-motor 3 from generator operation to motor operation to apply torque to the internal combustion engine 1 from the generator-motor 3. Also in Step 307, a command for fuel injection resumption is issued.

In Step 308, immediately after the command for motor operation is issued to the electric power control unit 5, the ignition signal inputted from the igniter (not illustrated) is counted. When the counter value reaches 3 in Step 309, the motor operation stop command is issued to the electric power control unit 5 in Step 310, and then the electric power control unit 5 stops the motor operation and switches to the generator operation of the generator-motor 3, whereby the torque application from the generator-motor 3 to the internal combustion engine 1 is stopped. Then, the process proceeds to Step 102.

As torque is applied to the internal combustion engine 1 in this routine, the threshold rpm Neo for fuel injection resumption (i.e., torque increase command) can be set to a lower value. In addition, as the torque is applied for the minimum required period, consumption of electric power of the battery 8 for the motor operation can be saved.

In the first and second embodiments, the torque application is stopped with the timing of the third ignition from the torque increase command (e.g., Step 306). It also is acceptable that the torque application is stopped with the timing near the third ignition timing, i.e., immediately after the second or fourth ignition timing. Even in this case, the advantageous effects of both electric power saving and torque application can be obtained.

For reference, Step 307 constitutes torque application start commanding means, and Step 310 constitutes torque application stop commanding means.

Figure 6:
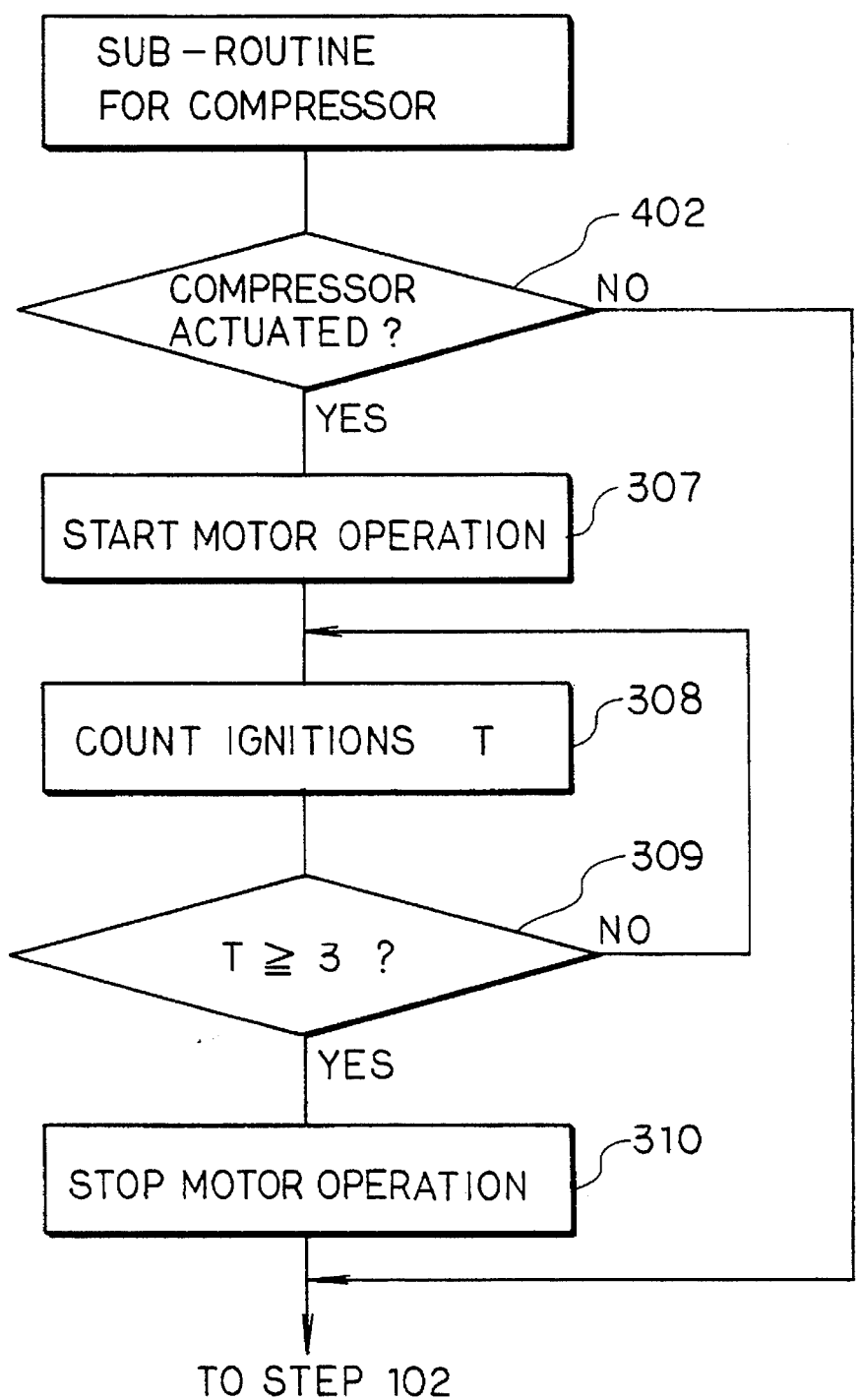
FIG. 6 is a flow chart illustrating a third embodiment of the torque application operation of the torque control system for internal combustion engines illustrated in FIG. 1.

Still another embodiment is illustrated in FIG. 6 as the third embodiment. In this embodiment, Steps 302 through 306 inclusive of the flow chart illustrated in FIG. 5 are replaced by Step 402.

In Step 402, a judgement is formed whether or not a compressor (not illustrated) for an air-conditioner is actuated or operatively connected to the internal combustion engine 1 to be driven thereby by detecting the signal (torque increase command) from an engine control unit (not illustrated). If the judgement is positive, the process proceeds to Step 307, and the torque application start operation and torque application stop operation are performed in the same way.

The present invention described above should not be limited to the above embodiments but may be modified in various ways.

What is claimed is:

1. A torque control system for an engine in which an air-fuel mixture is increased in response to a torque increase command, said system comprising:

torque applying means for applying torque to an engine;

ignition detecting means for detecting ignition timings of said engine;

torque applying start commanding means for issuing a torque application operation start command to said torque applying means in response to said torque increase command; and torque application stop commanding means for issuing a torque application operation stop command to said torque applying means immediately after detection of an ignition timing of the increased air-fuel mixture so that torque application by said torque applying means is stopped thereby.

2. A torque control system according to claim 1, wherein said torque application start commanding means issues said torque application start command responsive to a change in an opening of a throttle valve of said engine in an acceleration direction.

3. A torque control system according to claim 1, wherein said torque application start commanding means issues said torque application start command responsive to a decrease in rotational speed of said engine under a fuel cut-off condition.

4. A torque control system according to claim 1, wherein said torque application start commanding means issues said torque application start command responsive to engagement of a compressor of an air-conditioner with said engine.

5. A torque control system according to claim 1, wherein said ignition detection means counts a number of ignitions of said engine and said torque applying stop commanding means issues said torque application operation stop command when said number reaches a predetermined number after issuance of said torque application operation start command.

6. A torque control system according to claim 1, wherein said torque applying means includes an electric generator-motor which performs electric power generation and electric motor operation for torque application.

7. A torque control system according to claim 6 further comprising:

crank angle detecting means for detecting a crank angle of said engine;

condition detecting means for detecting a condition of said engine related to a phase difference between the detected crank angle and a primary component of a vehicle vibration which is a composite vector of a rotational vibration component and a vertical vibration component;

operation mode setting means for setting an operation mode of said electric generator-motor to a mode capable of reducing both of said vibration components in accordance with said detected condition; and control means for controlling said electric generator-motor in accordance with said set mode.

8. A torque control system according to claim 7, wherein said condition detecting means detects an idling of said engine as said condition based on a rotational speed of said engine and an opening of said throttle valve.

9. A torque control system for an engine, said system comprising:

electric generator-motor means for performing a generator operation to generate electric power and for performing a motor operation to apply torque to an engine;

detecting means for detecting a predetermined condition which requires torque increase of said engine;

ignition counting means for counting a number of ignitions in said engine after detection of said predetermined condition by said detecting means; and switching means for switching said electric generator-motor means from said generator operation to said motor operation in response to said detection of said predetermined condition by said detecting means and for switching from said motor operation to said generator operation in response to counting a predetermined number of ignitions by said ignition counting means.

10. A torque control system according to claim 9, wherein said detecting means is for detecting as said predetermined condition an increase of throttle opening in an engine acceleration direction.

11. A torque control system according to claim 9, wherein said detecting means is for detecting as said predetermined condition a decrease of engine rotational speed below a predetermined speed under a fuel cut-off condition.

12. A torque control system according to claim 9, wherein said detecting means is for detecting as said predetermined condition a connection of an air-conditioner compressor to said engine.

13. A torque control system for an engine in which an air-fuel mixture is increased in response to a torque increase command, said system comprising:

torque applying means for applying torque to an engine;

ignition detecting means for detecting ignition timings of said engine; and programmed control means for:
issuing a torque application operation start command to said torque applying means in response to said torque increase command; and
issuing a torque application operation stop command to said torque applying means immediately after detection of an ignition timing of the increased air-fuel mixture so that torque application by said torque applying means is stopped thereby;

whereby operation of said torque applying means is terminated to substantially avoid overlap of torque application by said torque applying means and increased torque application by said engine responsive to said torque increase command and thereby conserve power consumption by said torque applying means.

14. A torque control system according to claim 13, wherein said programmed control means issues said torque application start command responsive to a change in an opening of a throttle valve of said engine in an acceleration direction.

15. A torque control system according to claim 13, wherein said programmed control means issues said torque application start command responsive to a decrease in rotational speed of said engine under a fuel cut-off condition.

16. A torque control system according to claim 13, wherein said programmed control means issues said torque application start command responsive to engagement of a compressor of an air-conditioner with said engine.

17. A torque control system according to claim 13, wherein said ignition detection means counts a number of ignitions of said engine; and said programmed control means issues said torque application operation stop command when said number reaches a predetermined number after issuance of said torque application operation start command.

18. A torque control system according to claim 13, wherein said torque applying means includes an electric generator-motor which performs electric power generation and electric motor operation for torque application.

19. A torque control system according to claim 13, wherein:

said torque applying means is further constructed and arranged to operate as a generator and is responsive, when said programmed control means issues said torque application operation stop command, to operate as a generator.

20. A torque control system according to claim 18, further comprising:

crank angle detecting means for detecting a crank angle of said engine;

wherein said programmed control means is further for detecting a condition of said engine related to a phase difference between the detected crank angle and a primary component of a vehicle vibration which is a composite vector of a rotational vibration component and a vertical vibration component,
setting an operation mode of said electric generator-motor to a mode capable of reducing both of said vibration components in accordance with said detected condition, and
controlling said electric generator-motor in accordance with said set mode.

21. A torque control system according to claim 20, wherein said programmed microprocessor means detects an idling of said engine as said condition based on a rotational speed of said engine and an opening of said throttle valve.

22. A torque control system for an engine, said system comprising:

electric generator-motor means for performing a generator operation to generate electric power and for performing a motor operation to apply torque to an engine; and programmed control means for
detecting a predetermined condition which requires torque increase of said engine,
counting a number of ignitions in said engine after detection of said predetermined condition, and
switching said electric generator-motor means from said generator operation to said motor operation in response to said detection of said predetermined condition and for switching from said motor operation to said generator operation in response to counting a predetermined number of ignitions;

whereby operation of said electric motor-generator means is terminated to substantially avoid overlap of torque application by said electric motor-generator means and increased torque application by said engine responsive to said predetermined condition and thereby conserve power consumption by said electric motor-generator means.

23. A torque control system according to claim 22, wherein said programmed control means is for detecting as said predetermined condition an increase of throttle opening in an engine acceleration direction.

24. A torque control system according to claim 22, wherein said programmed control means is for detecting as said predetermined condition a decrease of engine rotational speed below a predetermined speed under a fuel cut-off condition.

25. A torque control system according to claim 22, wherein said programmed control means is for detecting as said predetermined condition a connection of an air-conditioner compressor to said engine.

26. A method of controlling a motor-generator connected to an engine, said method comprising the steps of:

receiving a command for said engine to increase its torque output;

operating said motor-generator as a motor to apply torque to said engine responsive to said command;

detecting a predetermined engine condition indicative of an imminent increase in torque output by said engine; and terminating operation of said motor-generator as a motor responsive to said detected condition;

whereby operation of said motor-generator is terminated to substantially avoid overlap of torque application by said motor-generator and increased torque application by said engine responsive to said command and thereby conserve power consumption by said motor-generator.

27. The method of claim 26, wherein said operating step comprises a step of operating said motor-generator as a motor responsive to a change in an opening of a throttle valve of said engine in an acceleration direction.

28. The method of claim 26, wherein said operating step comprises a step of operating said motor-generator as a motor responsive to a decrease in rotational speed of said engine under a fuel cut-off condition.

29. The method of claim 26, wherein said operating step comprises a step of operating said motor-generator as a motor responsive to engagement of a compressor of an air-conditioner with said engine.

30. The method of claim 26, wherein:

said detecting step comprises a step of counting a number of ignitions of said engine; and said terminating step comprises a step of terminating motor operation of said motor-generator when said number reaches a predetermined number after execution of said operating step.

31. A torque control system according to claim 26, wherein said terminating step comprises a step of initiating generator operation of said motor-generator.

* * * * *